United States Patent
Endoh et al.

(10) Patent No.: US 6,823,668 B2
(45) Date of Patent: Nov. 30, 2004

(54) WASTE HEAT RECOVERY DEVICE OF INTERNAL COMBUSTION ENGINE

(75) Inventors: Tsuneo Endoh, Wako (JP); Masashi Shinohara, Wako (JP); Hiroyuki Tanaka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/380,999

(22) PCT Filed: Sep. 21, 2001

(86) PCT No.: PCT/JP01/08258

§ 371 (c)(1),
(2), (4) Date: Aug. 13, 2003

(87) PCT Pub. No.: WO02/25077

PCT Pub. Date: Mar. 28, 2002

(65) Prior Publication Data

US 2004/0025501 A1 Feb. 12, 2004

(30) Foreign Application Priority Data

Sep. 25, 2000 (JP) ........................................ 2000-295422

(51) Int. Cl.[7] .................................................. F01N 5/02
(52) U.S. Cl. .............................. 60/320; 60/321; 165/51; 165/163; 165/156; 123/556
(58) Field of Search ................................ ; 60/320, 321; 165/51, 146, 163, 156; 123/41.52, 41.82 R, 41.76, 556; F01N 5/02

(56) References Cited

U.S. PATENT DOCUMENTS

| 3,874,345 A | * | 4/1975 | Earnest | 165/163 |
| 4,284,055 A | * | 8/1981 | Wakeman | 123/556 |
| 6,095,240 A | * | 8/2000 | Hassanein et al. | 165/163 |
| 6,607,027 B2 | * | 8/2003 | Bosch et al. | 165/163 |
| 2003/0056504 A1 | * | 3/2003 | Ohta et al. | 60/320 |
| 2003/0155108 A1 | * | 8/2003 | Shinohara et al. | 165/146 |

FOREIGN PATENT DOCUMENTS

| DE | 2926970 A1 | * | 1/1981 | ............ F02B/47/00 |
| DE | 4141051 A1 | * | 6/1993 | ............ F01N/5/02 |
| EP | 1249585 A1 | * | 10/2002 | ............ F01N/5/02 |
| EP | 1249586 A1 | * | 10/2002 | ............ F01N/5/02 |
| JP | 57206719 A | * | 12/1982 | ............ F01N/5/02 |
| JP | 58-024789 A | * | 2/1983 | ............ F28D/7/02 |
| JP | 59-174308 U | | 11/1984 | ............ F01N/5/02 |
| JP | 7-217815 A | | 8/1995 | ............ F01N/5/02 |
| JP | 8-14606 A | | 1/1996 | ............ F01N/5/02 |
| JP | 2000-73753 A | | 3/2000 | ............ F01N/5/02 |
| JP | 2002070528 A | * | 3/2002 | ............ F01N/3/02 |
| JP | 2002115540 A | * | 4/2002 | ............ F01N/5/02 |
| JP | 2002188437 A | * | 7/2002 | ............ F01N/5/02 |
| JP | 2003155928 A | * | 5/2003 | ............ F01N/5/02 |
| JP | 2003185363 A | * | 7/2003 | ............ F01N/5/02 |

* cited by examiner

Primary Examiner—Thai-Ba Trieu
(74) Attorney, Agent, or Firm—Birch, Stewart, Kolasch & Birch, LLP

(57) ABSTRACT

An internal combustion engine waste heat recovery system is provided in which a second heat exchanger, a fifth heat exchanger, a fourth heat exchanger, a third heat exchanger, and a first heat exchanger are disposed sequentially from the upstream side to the downstream side of the flow of exhaust gas in an engine exhaust passage. Water, used as a working medium, is supplied sequentially to the first, second, third, fourth and the fifth heat exchangers. Water having the lowest temperature can be supplied to the first heat exchanger on the most downstream side of the gas flow, to which exhaust gas having a comparatively low temperature is supplied. Water having a comparatively low temperature, which has passed only through the first heat exchanger, can be supplied to the second heat exchanger on the most upstream side.

10 Claims, 12 Drawing Sheets

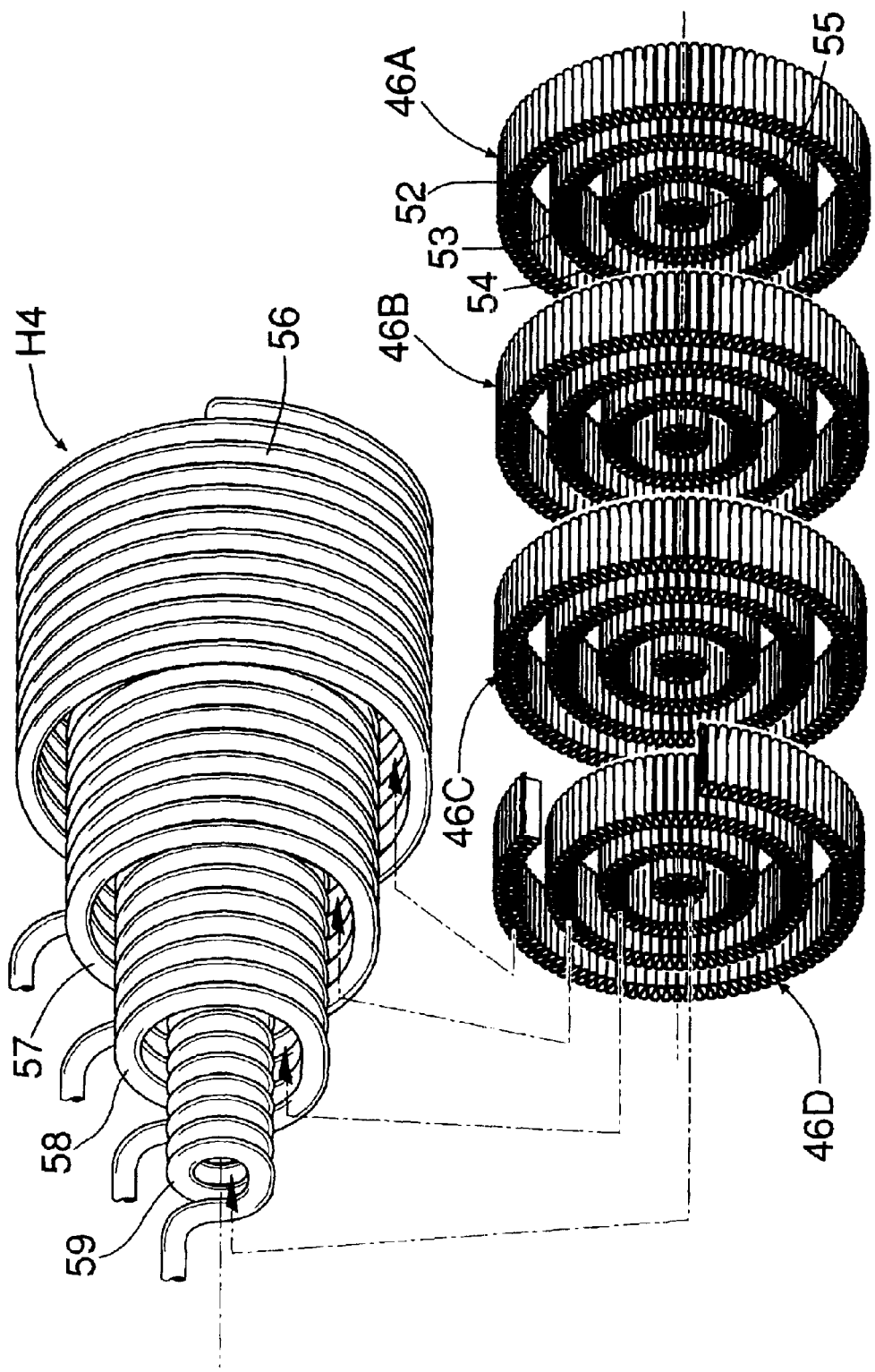

WASTE HEAT RECOVERY DEVICE OF INTERNAL COMBUSTION ENGINE

This application is the national phase under 35 U.S.C. § 371 of PCT International Application No. PCT/JP01/08258 which has an International filing date of Sep. 21, 2001, which designated the United States of America.

FIELD OF THE INVENTION

The present invention relates to an internal combustion engine waste heat recovery system that includes at least three stages of heat exchangers in an exhaust passage, a working medium flowing through the heat exchangers and carrying out heat exchange with an exhaust gas, and the heat exchanger disposed on the most upstream side of the flow of exhaust gas being positioned immediately downstream from an exhaust valve.

BACKGROUND ART

Japanese Utility Model Registration Application Laid-open No. 59-174308 discloses a Rankine cycle system that includes an evaporator for heating a liquid phase working medium with an exhaust gas of an internal combustion engine and generating a vapor, an expander that is driven by the vapor generated in the evaporator, a condenser for cooling the vapor that has passed through the expander and turning it back into the liquid phase working medium, and a feed pump for pressurizing the liquid phase working medium from the condenser and feeding it to the evaporator. In this conventional system, water as the liquid phase working medium is heated by passing it not only through the interior of the evaporator provided in an exhaust pipe of the internal combustion engine but also through the interior of cooling passages formed in a cylinder head and a cylinder block, thereby utilizing waste heat of the internal combustion engine more effectively and cooling the cylinder head and the cylinder block with the liquid phase working medium, so that use of a conventional radiator can be eliminated.

In the above-mentioned conventional system, since the working medium that has increased temperature after passing through the cooling passages of the cylinder head and the cylinder block is supplied to the evaporator, there is only a small difference in temperature between the working medium and the exhaust gas, the working medium passing through the evaporator cannot fully recover the thermal energy from the exhaust gas, the exhaust gas still having recoverable thermal energy is discharged wastefully, and there is a possibility that the entire waste heat recovery efficiency of the internal combustion engine might decrease.

In order to maximize the amount of thermal energy recovered from the exhaust gas, it is desirable to employ a cross-flow system in which the exhaust gas and the working medium flow in opposite directions from each other. That is, since the temperature of the exhaust gas decreases as heat exchange progresses and the temperature of the working medium increases as heat exchange progresses, making the working medium flow within the evaporator from the downstream side to the upstream side of the flow of exhaust gas can maintain a large difference in temperature between the working medium and the exhaust gas throughout the evaporator, thus maximizing the heat exchange efficiency. However, in this arrangement since the working medium has an increased temperature when it reaches a position immediately downstream from an exhaust valve, which is a high temperature section of the exhaust passage of an internal combustion engine, there is a possibility that the high temperature section might not be cooled sufficiently.

DISCLOSURE OF INVENTION

The present invention has been accomplished in view of the above-mentioned circumstances, and it is an object of the present invention to cool effectively a high temperature exhaust passage immediately downstream from an exhaust valve while maintaining the efficiency of waste heat recovery from an exhaust gas of an internal combustion engine.

In order to accomplish this object, in accordance with an aspect of the present invention, there is proposed an internal combustion engine waste heat recovery system that includes at least three stages of heat exchangers in an exhaust passage, a working medium flowing through the heat exchangers and carrying out heat exchange with an exhaust gas, and the heat exchanger disposed on the most upstream side of the flow of exhaust gas being positioned immediately downstream from an exhaust valve, characterized in that the working medium is firstly supplied to the heat exchanger disposed on the most downstream side of the flow of exhaust gas, and then supplied to the heat exchanger disposed on the most upstream side of the flow of exhaust gas.

In accordance with this arrangement, with regard to the internal combustion engine that includes at least three stages of heat exchangers in the exhaust passage, since the working medium is firstly supplied to the heat exchanger disposed on the most downstream side of the flow of exhaust gas and then supplied to the heat exchanger disposed on the most upstream side of the flow of exhaust gas, the working medium having a comparatively low temperature can be supplied to the heat exchanger disposed on the most upstream side of the flow of exhaust gas, thus effectively cooling a high temperature section immediately downstream from an exhaust valve of the internal combustion engine and thereby enhancing the durability of the exhaust passage and its peripheral devices, which are exposed to high temperature. Furthermore, since the working medium having the lowest temperature is supplied to the heat exchanger disposed on the most downstream side of the flow of exhaust gas, to which the exhaust gas having a comparatively low temperature is supplied, a difference in temperature between the exhaust gas and the working medium can be maintained and recoverable thermal energy of the exhaust gas can be recovered without waste, thereby increasing the heat exchange efficiency. As a result, the high temperature exhaust passage immediately downstream from the exhaust valve can be cooled effectively while maintaining the efficiency of waste heat recovery from the exhaust gas of the internal combustion engine.

A first stage heat exchanger H1 of an embodiment corresponds to the heat exchanger disposed on the most downstream side of the flow of exhaust gas of the present invention, and a second stage heat exchanger H2 of the embodiment corresponds to the heat exchanger disposed on the most upstream side of the flow of exhaust gas of the present invention.

BRIEF DESCRIPTION OF DRAWINGS

FIG. 1 to FIG. 12B illustrate one embodiment of the present invention.

FIG. 1 is a vertical cross section of a cylinder head part of an internal combustion engine;

FIG. 2 is a magnified cross section of an essential part in FIG. 1;

FIG. 3 is a view from the arrowed line 3—3 in FIG. 2;

FIG. 4 is a cross section along line 4—4 in FIG. 2;

FIG. 5 is a cross section along line 5—5 in FIG. 2;

FIG. 6 is a magnified view of an essential part in FIG. 2;

FIG. 7 is a magnified view of part 7 in FIG. 4;

FIG. 8 is a cross section along line 8—8 in FIG. 3;

FIG. 10 is an exploded perspective view of a metal catalytic system and a fourth stage heat exchanger;

FIG. 11 is a schematic view showing a water supply route of an evaporator;

FIG. 12B is a graph showing changes in the exhaust gas temperature and the vapor temperature with the cumulative heat transfer area of a heat exchanger of the present embodiment.

BEST MODE FOR CARRYING OUT THE INVENTION

An embodiment of the present invention is explained below by reference to FIGS. 1 to 12B.

Figure 1:
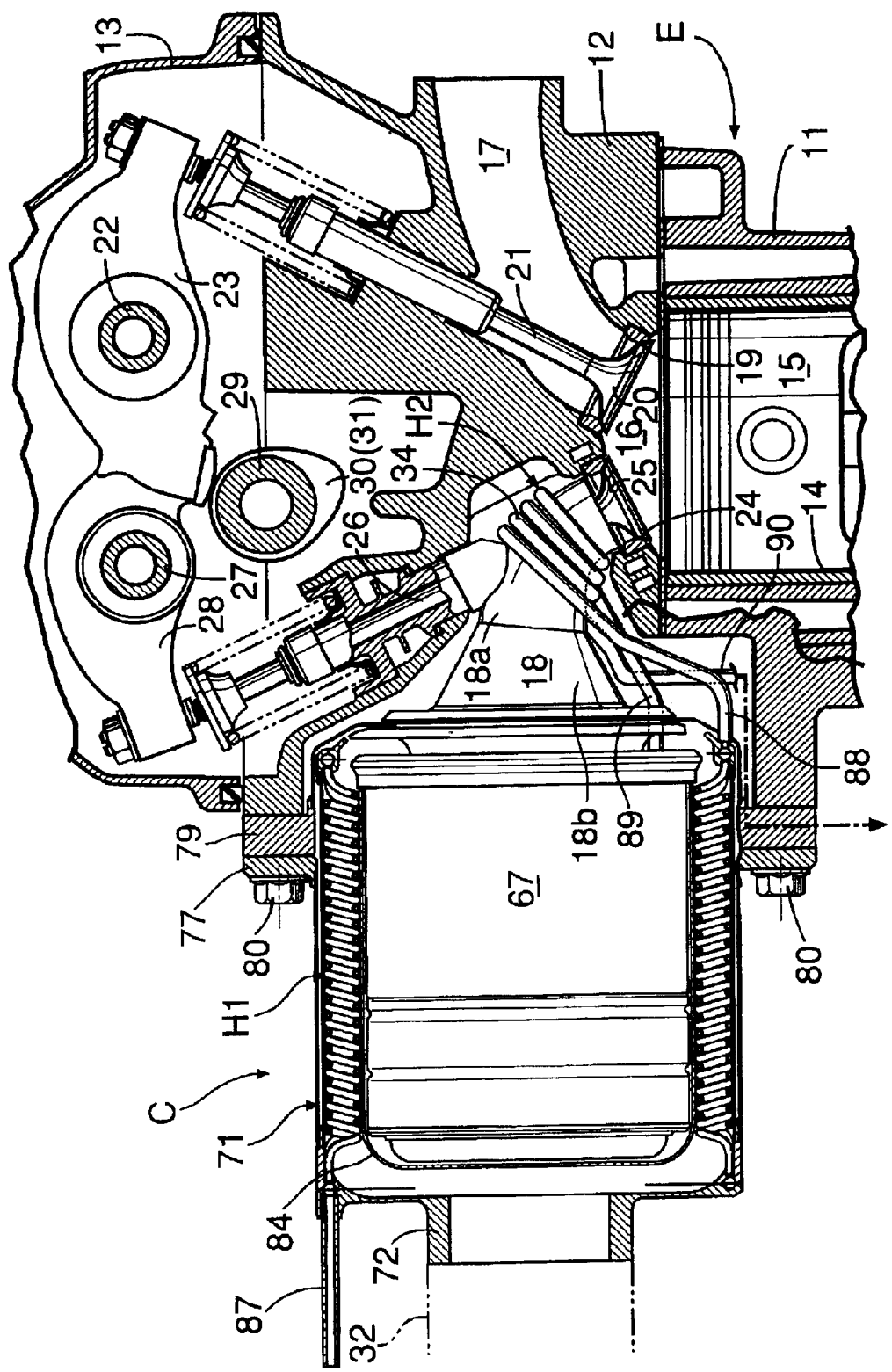

As shown in FIG. 1, an internal combustion engine E includes a cylinder block 11, a cylinder head 12, and a head cover 13, which are vertically stacked, and a piston 15 is slidably fitted in a cylinder bore 14 formed in the cylinder block 11. Among an intake port 17 and an exhaust port 18 individually communicating with a combustion chamber 16 formed in the cylinder head 12, the intake port 17 is bored within the cylinder head 12 as is conventional, but the exhaust port 18 is formed from a separate member and is joined to the cylinder head 12.

The upper end of a stem 21 of an intake valve 20 that opens and closes an intake valve hole 19 abuts against one end of an intake rocker arm 23 pivotably supported on an intake rocker arm shaft 22, and the upper end of a stem 26 of an exhaust valve 25 that opens and closes an exhaust valve hole 24 abuts against one end of an exhaust rocker arm 28 pivotably supported on an exhaust rocker arm shaft 27. The other end of the intake rocker arm 23 and the other end of the exhaust rocker arm 28 abut against an intake cam 30 and an exhaust cam 31 respectively provided on a camshaft 29 rotating in association with a crankshaft, which is not illustrated, thereby making the intake valve 20 and the exhaust valve 25 open and close.

Provided on a side face of the cylinder head 12 on the exhaust side is an integrated evaporator type exhaust gas purification system C. The structure of the integrated evaporator type exhaust gas purification system C is explained below by reference to FIGS. 2 to 11.

The evaporator generates steam having increased temperature and pressure using exhaust gas from the internal combustion engine E as a heat source, and includes an exhaust passage 33 having the exhaust port 18 as a base end and extending to an exhaust pipe 32, and heat exchangers H1 to H5 disposed within the exhaust passage 33 and carrying out heat exchange with the exhaust gas. Metal catalytic systems 46A to 46D, which will be described later, are incorporated into the fourth stage heat exchanger H4.

The exhaust port 18 is formed from a uniform diameter part 18a positioned on the upstream side of the flow of exhaust gas, and having a substantially constant diameter, and an increasing diameter part 18b provided so as to be connected to the downstream side of the uniform diameter part 18a and having a diameter that increases in a trumpet shape; the second stage heat exchanger H2 is provided around the outer periphery of the uniform diameter part 18a, and the fifth stage heat exchanger H5 is provided within the increasing diameter part 18b. The second stage heat exchanger H2 is formed from about 5 turns of a single heat transfer tube 34 wound around the outer periphery of the uniform diameter part 18a. The fifth stage heat exchanger H5 is formed from multiple windings of a single heat transfer tube 35 and is housed within the increasing diameter part 18b.

Figure 9A:
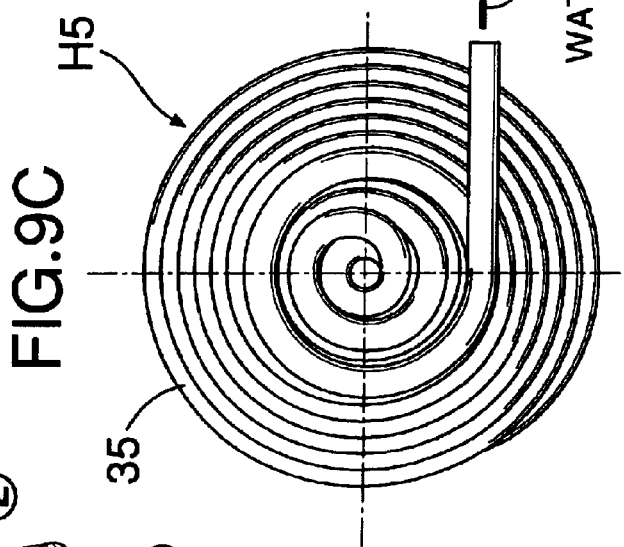
FIG. 9A to FIG. 9C are diagrams showing a heat transfer tube of a fifth stage heat exchanger.
Figure 9C:
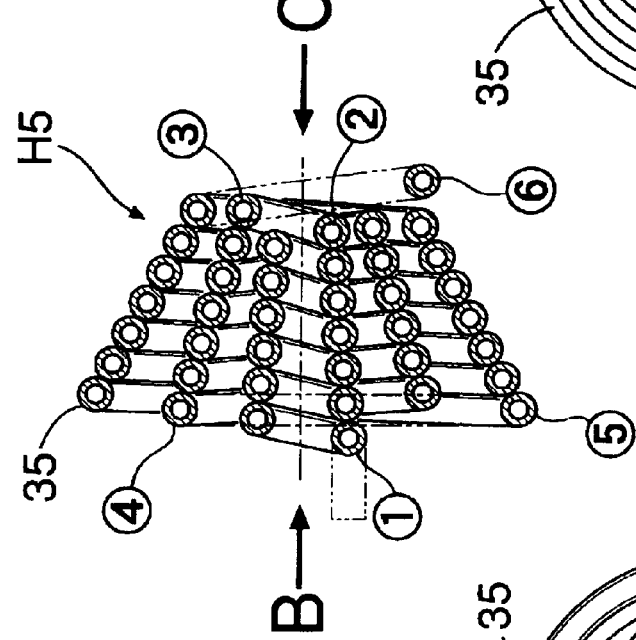
Figure 9B:
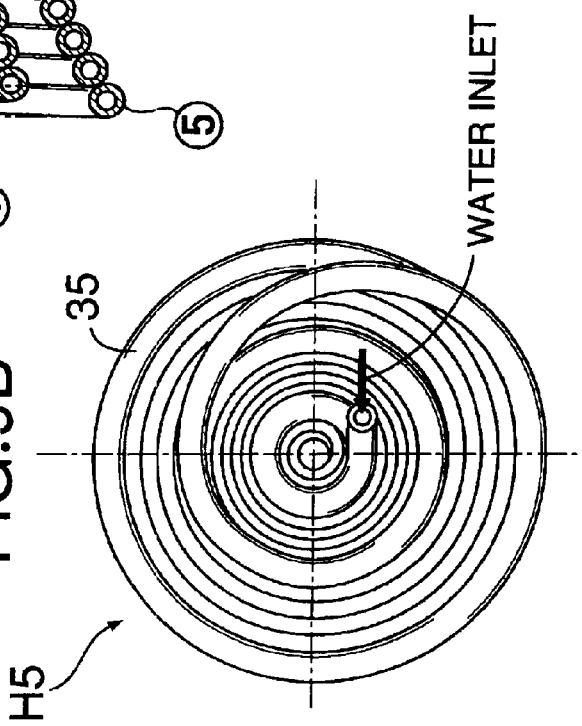

As is clear from reference to FIGS. 9A to 9C, the heat transfer tube 35 of the fifth stage heat exchanger H5 is wound into a triple coil shape that is tapered so as to conform to the shape of the interior of the increasing diameter part 18b of the exhaust port 18; the coil in the inner layer is wound from the rear (the left-hand side in the figure) toward the front (the right-hand side in the figure) while decreasing in diameter and is folded back at the front end; this is followed by the coil in the middle layer, which is wound from the front toward the rear while increasing in diameter and is folded back at the rear end; and this is followed by the coil in the outer layer, which is wound from the rear toward the front while decreasing in diameter. A water inlet shown in FIG. 9B is connected to the fourth stage heat exchanger H4, which is on the upstream side and will be described later, and a water outlet shown in FIG. 9C is connected to a steam outlet 90, which will be described later. The circled numerals 1 to 6 shown in FIG. 9A show the route via which water flows through the heat transfer tube 35.

Winding the heat transfer tube 35 of the fifth stage heat exchanger H5 into the triple coil shape that is tapered so as to conform to the shape of the interior of the increasing diameter part 18b of the exhaust port 18 makes it possible for there to be a rectifying effect on the exhaust gas that flows through the increasing diameter part 18b, thereby contributing to a reduction in the circulation resistance.

Figure 2:
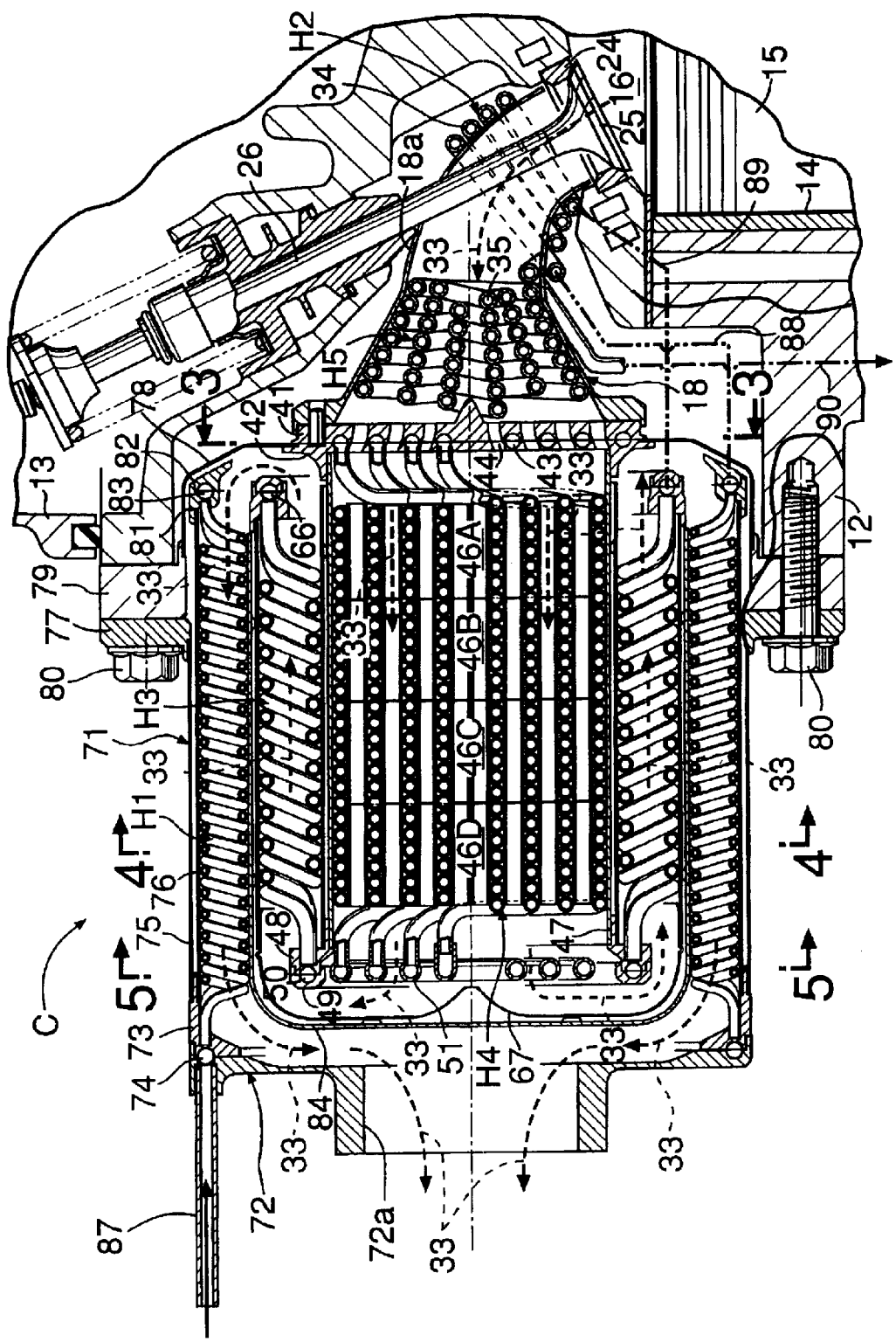
Figure 3:
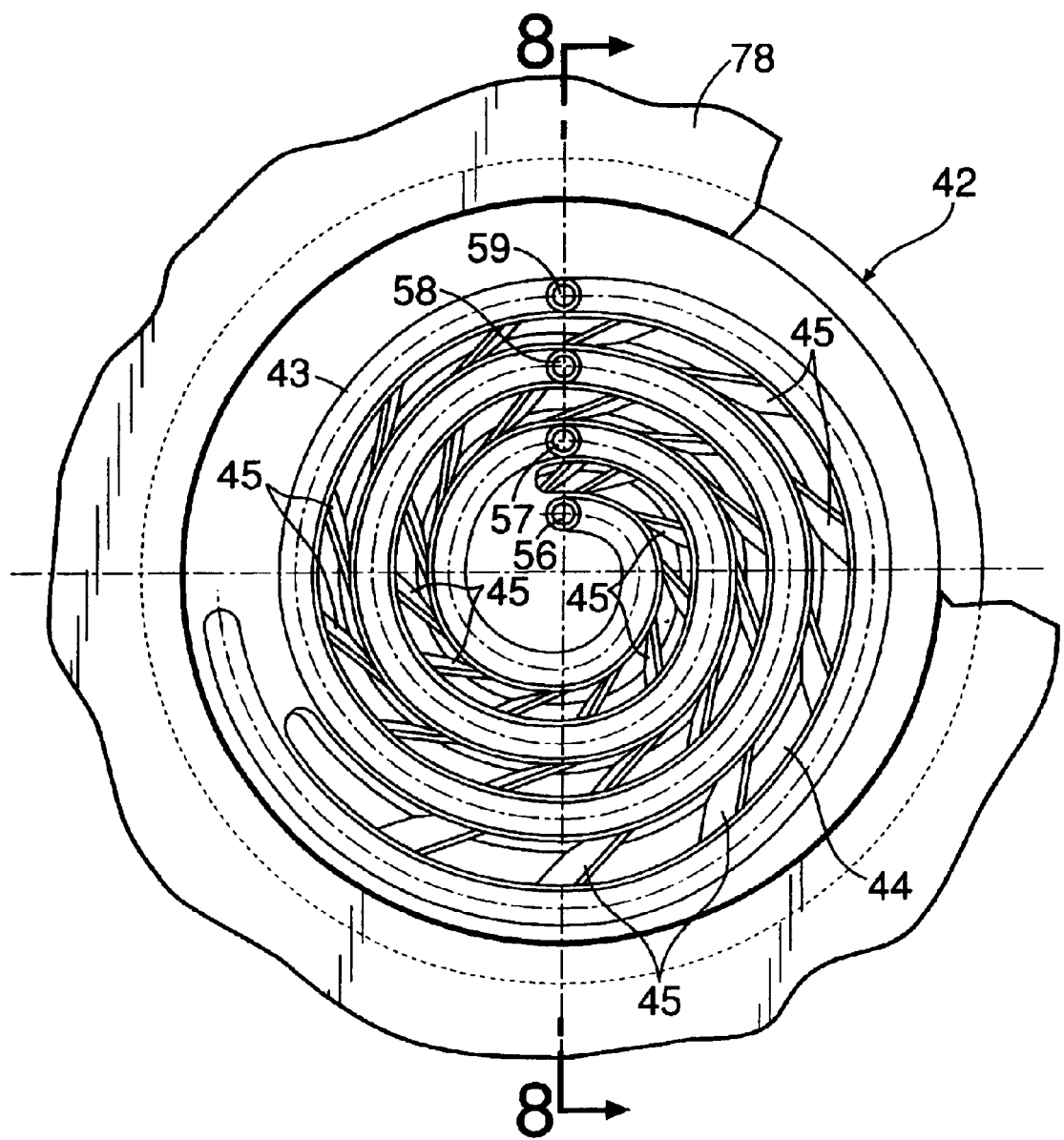
Figure 4:
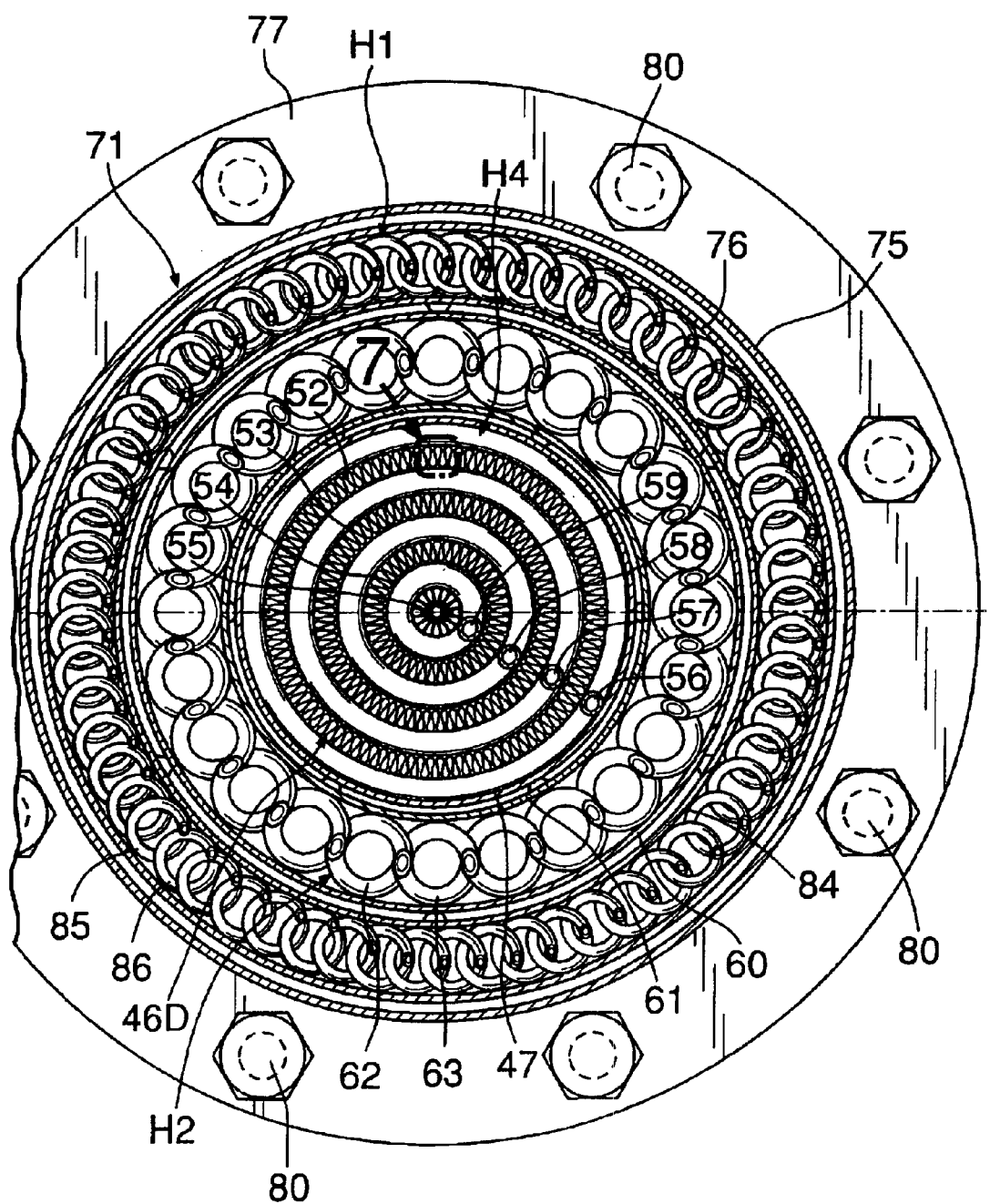
Figure 5:
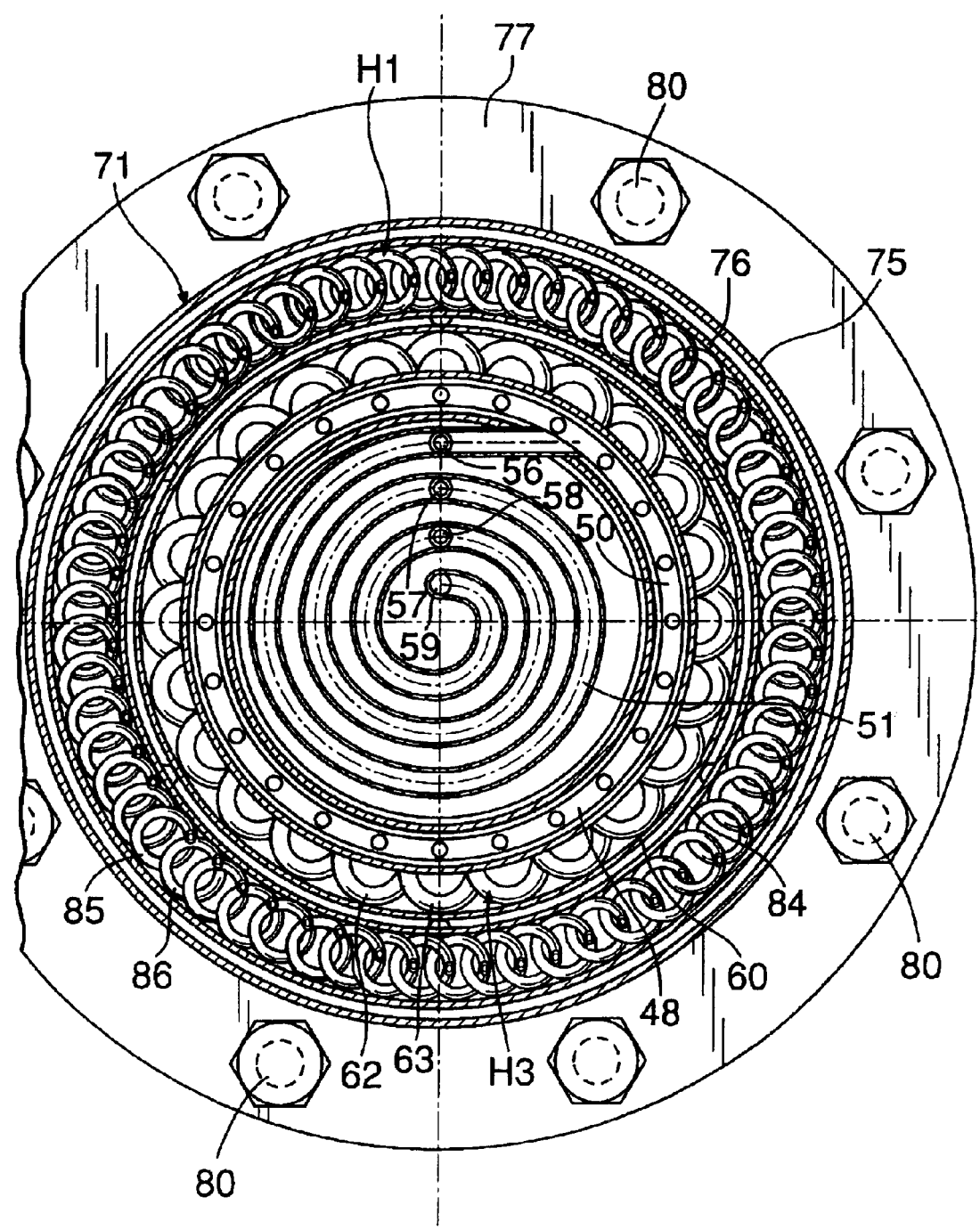
Figure 6:
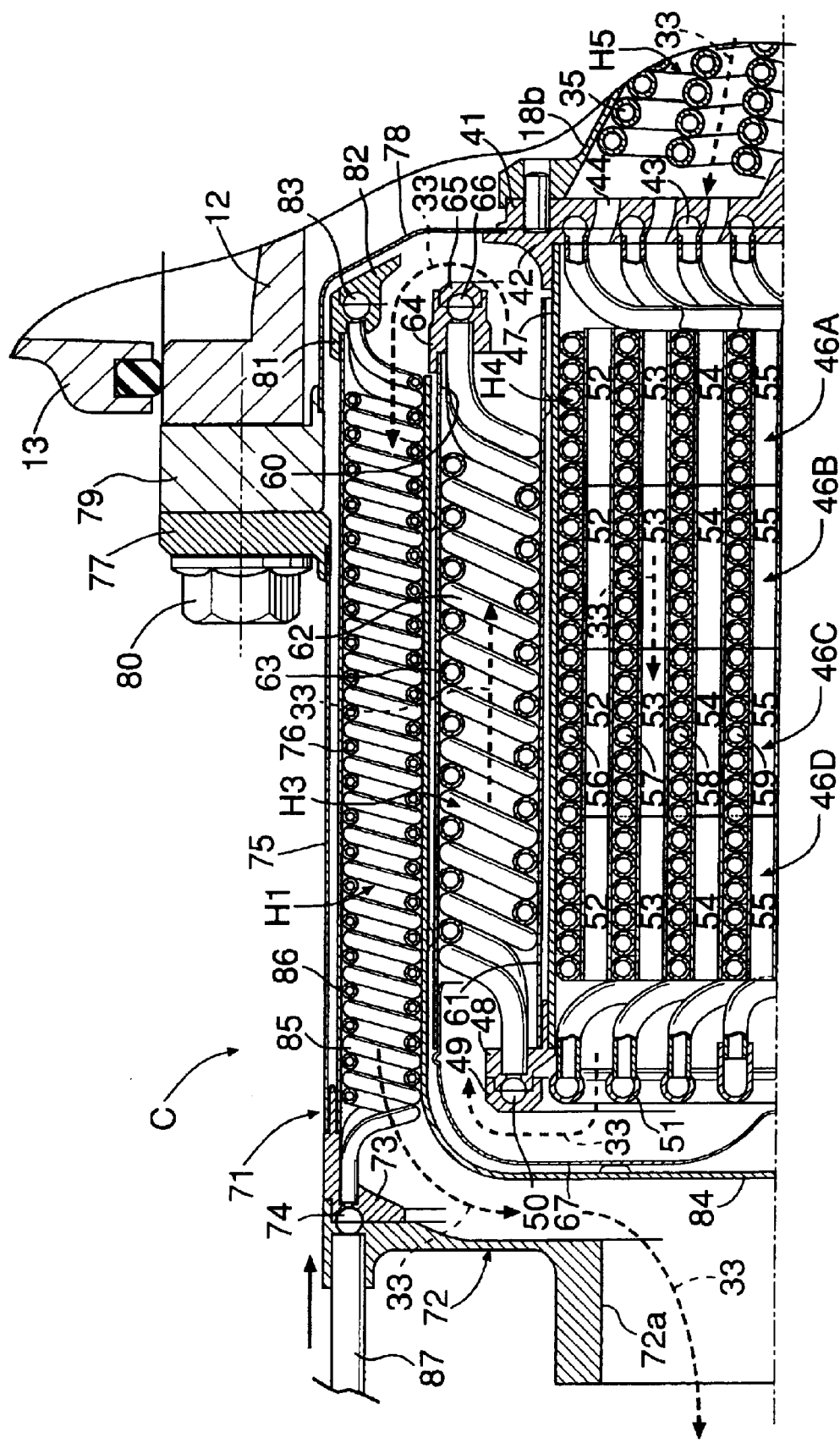
Figure 8:
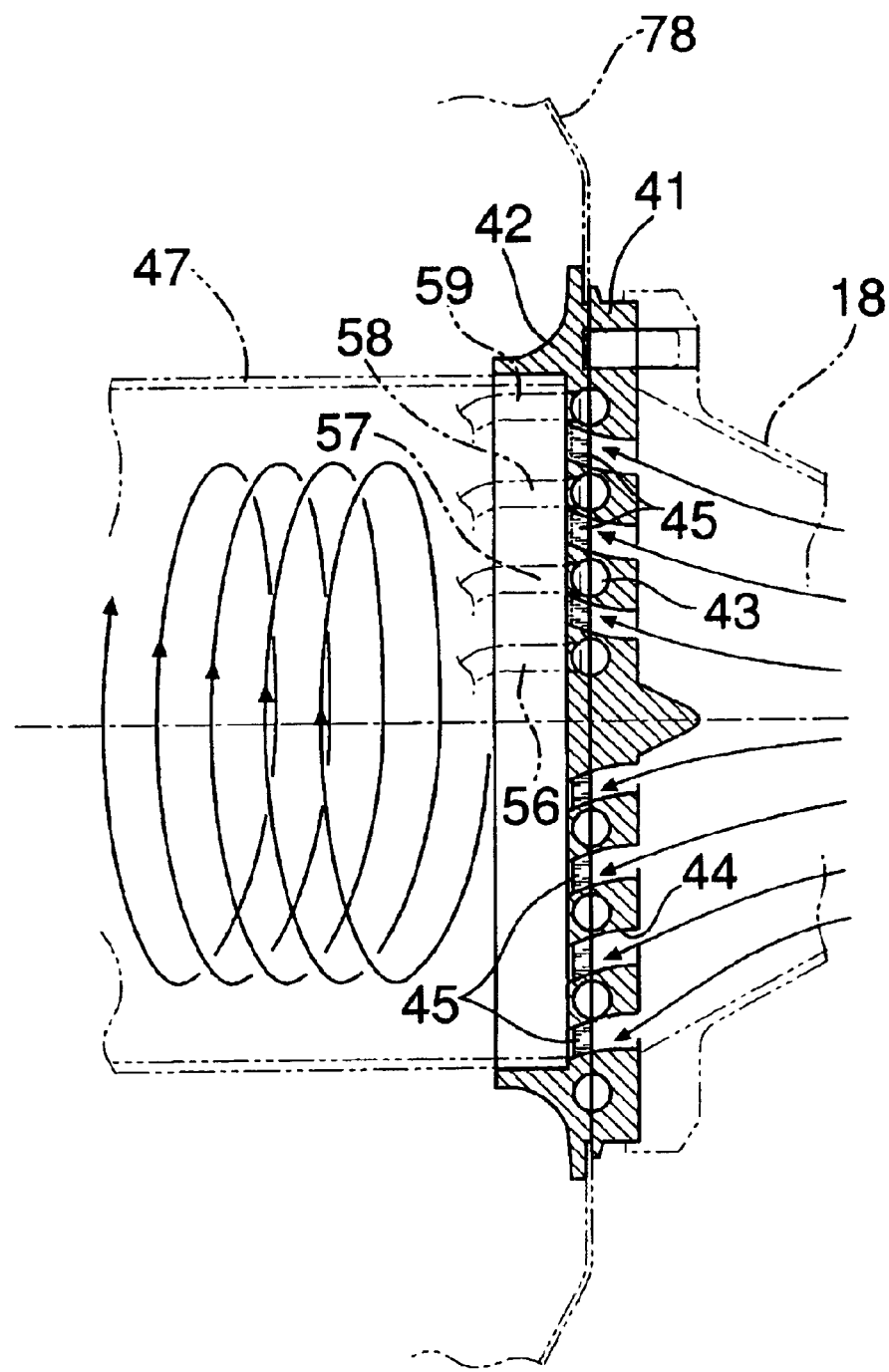

As is most clearly shown in FIGS. 2, 3 and 8, a disk-shaped distribution passage forming member 41 is joined to the rear end of the increasing diameter part 18b of the exhaust port 18, and joining another disk-shaped distribution passage forming member 42 to the rear face of the distribution passage forming member 41 forms a second helical distribution passage 43 between the two distribution passage forming members 41, 42. The radially inner end of the second helical distribution passage 43 is connected to the upstream end of the heat transfer tube 35 of the fifth stage heat exchanger H5. A helical opening 44 is formed in the two distribution passage forming members 41, 42 so as to follow the second helical distribution passage 43. The cross section of the second helical opening 44 is inclined radially outward at the exit side so as to follow the inclination of the increasing diameter part 18b of the exhaust port 18, and a large number of guide vanes 45 are attached to the interior thereof in an inclined manner. The exhaust gas supplied from the increasing diameter part 18b of the exhaust port 18 therefore flows in a spiral while diffusing radially outward when passing through the helical opening 44.

Figure 7:
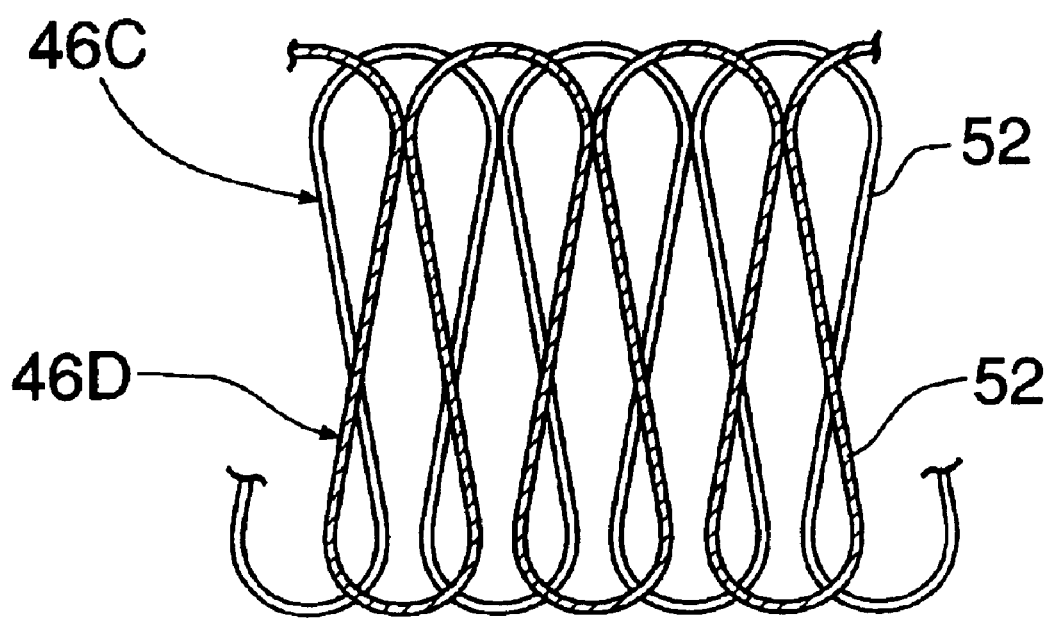

As is most clearly shown in FIGS. 2, 4 to 6, and 10, the front end of a cylindrical case 47 covering the outer peripheries of the first stage metal catalytic system 46A to the fourth stage metal catalytic system 46D and the fourth stage heat exchanger H4 is joined to the distribution passage forming member 42, a fourth circular distribution passage 50 is formed between two annular distribution passage forming members 48, 49, which are superimposed on one another and joined to the rear end of the cylindrical case 47, and the fourth circular distribution passage 50 is connected to the outer end of a first helical distribution passage 51 formed by curving a pipe into a helical shape. The first stage metal catalytic system 46A to the fourth stage metal catalytic system 46D, which are disposed in line, are each made by forming concentrically disposed annular corrugated metal supports 52 to 55 having four different diameters and supporting an exhaust gas purification catalyst on the surface thereof. As shown in FIG. 7 in a magnified manner, the phases of the corrugations of the metal supports 52 to 55 of each stage of the metal catalytic systems 46A to 46D are displaced by half a pitch from each other.

The fourth stage heat exchanger H4 is formed from four heat transfer tubes 56 to 59 that have different diameters and are wound into a coiled shape (see FIG. 10). The four heat transfer tubes 56 to 59 are housed within the cylindrical case 47 so that they are concentric with and disposed alternately with the four metal supports 52 to 55 of the first stage metal catalytic system 46A to the fourth stage metal catalytic system 46D. The downstream ends of the four heat transfer tubes 56 to 59 are connected to a middle part of the second helical distribution passage 43, and the upstream ends of the four heat transfer tubes 56 to 59 are connected to a middle part of the first helical distribution passage 51.

Two cylindrical cases 60, 61 are coaxially disposed radially outside the cylindrical case 47 covering the outer peripheries of the first stage metal catalytic system 46A to the fourth stage metal catalytic system 46D and the fourth stage heat exchanger H4, and the third stage heat exchanger H3 is disposed in an annular form between the two cylindrical cases 60, 61. The third stage heat exchanger H3 is formed from a large number of heat transfer tubes 62 wound into a coiled shape in one direction and a large number of heat transfer tubes 63 wound in a coiled shape in the other direction, the tubes 62, 63 being disposed alternately so that parts thereof are meshed together, thereby increasing the packing density of the heat transfer tubes 62, 63 within the space. The outer peripheries of the first stage metal catalytic system 46A to the fourth stage metal catalytic system 46D and the fourth stage heat exchanger H4 are thus surrounded by the heat transfer tubes 62, 63 of the third stage heat exchanger H3.

A third circular distribution passage 66 is formed between an annular distribution passage forming member 64 fixed to the front end of the outer cylindrical case 60 and an annular distribution passage forming member 65 joined to the front face of the distribution passage forming member 64. The upstream ends of the heat transfer tubes 62, 63 of the third stage heat exchanger H3 are connected to the third circular distribution passage 66, and the downstream ends of the heat transfer tubes 62, 63 are connected to the fourth circular distribution passage 50. Fixed to the rear end of the cylindrical case 60 covering the outside of the third stage heat exchanger H3 is a dish-shaped end cap 67 covering the rear faces of the first stage metal catalytic system 46A to the fourth stage metal catalytic system 46D and the fourth stage heat exchanger H4.

A detachable cover 71 forming the outer casing of the integrated evaporator type exhaust gas purification system C includes a plate-shaped distribution passage forming member 72 having an exhaust hole 72a connected to the exhaust pipe 32 in its center and an annular distribution passage forming member 73 joined to the front face of the distribution passage forming member 72, and a first circular distribution passage 74 is formed between the two distribution passage forming members 72, 73. A cylindrical case 75 positioned radially outside and a cylindrical case 76 positioned radially inside extend forward, with a slight gap therebetween, from the distribution passage forming member 73, and a flange 77 provided on the front end of the outer cylindrical case 75 is superimposed on a flange 79 provided on the rear end of a mounting plate 78 fixed to the distribution passage forming member 42 and they are secured to the cylinder head 12 by bolts 80.

An annular distribution passage forming member 81 is fixed to the front end of the inner cylindrical case 76, and a second circular distribution passage 83 is formed by joining an annular distribution passage forming member 82 to the front face of the distribution passage forming member 81. The first circular distribution passage 74 and the second circular distribution passage 83 have identical shapes and face each other in the front to rear direction. A cup-shaped inner wall member 84 is housed within the cover 71, and the first stage heat exchanger H1 is disposed between the outer periphery of the inner wall member 84 and the inner periphery of the inner cylindrical case 76.

The first stage heat exchanger H1 has a similar structure to that of the third stage heat exchanger H3; a large number of heat transfer tubes 85 wound into a coiled shape in one direction and a large number of heat transfer tubes 86 wound into a coiled shape in the other direction are disposed alternately so that parts thereof are meshed together, and these heat transfer tubes 85, 86 surround the outer periphery of the third stage heat exchanger H3. The upstream ends of the heat transfer tubes 85, 86 are connected to the first circular distribution passage 74, and the downstream ends thereof are connected to the second circular distribution passage 83.

The materials for the heat transfer tube 34 of the second stage heat exchanger H2, the heat transfer tube 35 of the fifth stage heat exchanger H5, the heat transfer tubes 56 to 59 of the fourth stage heat exchanger H4, the heat transfer tubes 62, 63 of the third stage heat exchanger H3, and the heat transfer tubes 85, 86 of the first stage heat exchanger H1 are preferably heat-resistant stainless steel (austenite type such as SUS 316L or SUS 310S, ferrite type such as SUS 430 or SUS 444) or a nickel-based heat-resistant alloy. Joining of the heat transfer tubes is preferably carried out by brazing or mechanical restraint.

Furthermore, with regard to the metal supports 52 to 55 of the first stage metal catalytic system 46A to the fourth stage metal catalytic system 46D, heat-resistant stainless steel (e.g., 20 wt % Cr-5 wt % Al ferrite type stainless steel) or a nickel-based heat-resistant alloy metal foil (thickness 0.1 mm or below) is preferable.

Figure 11:
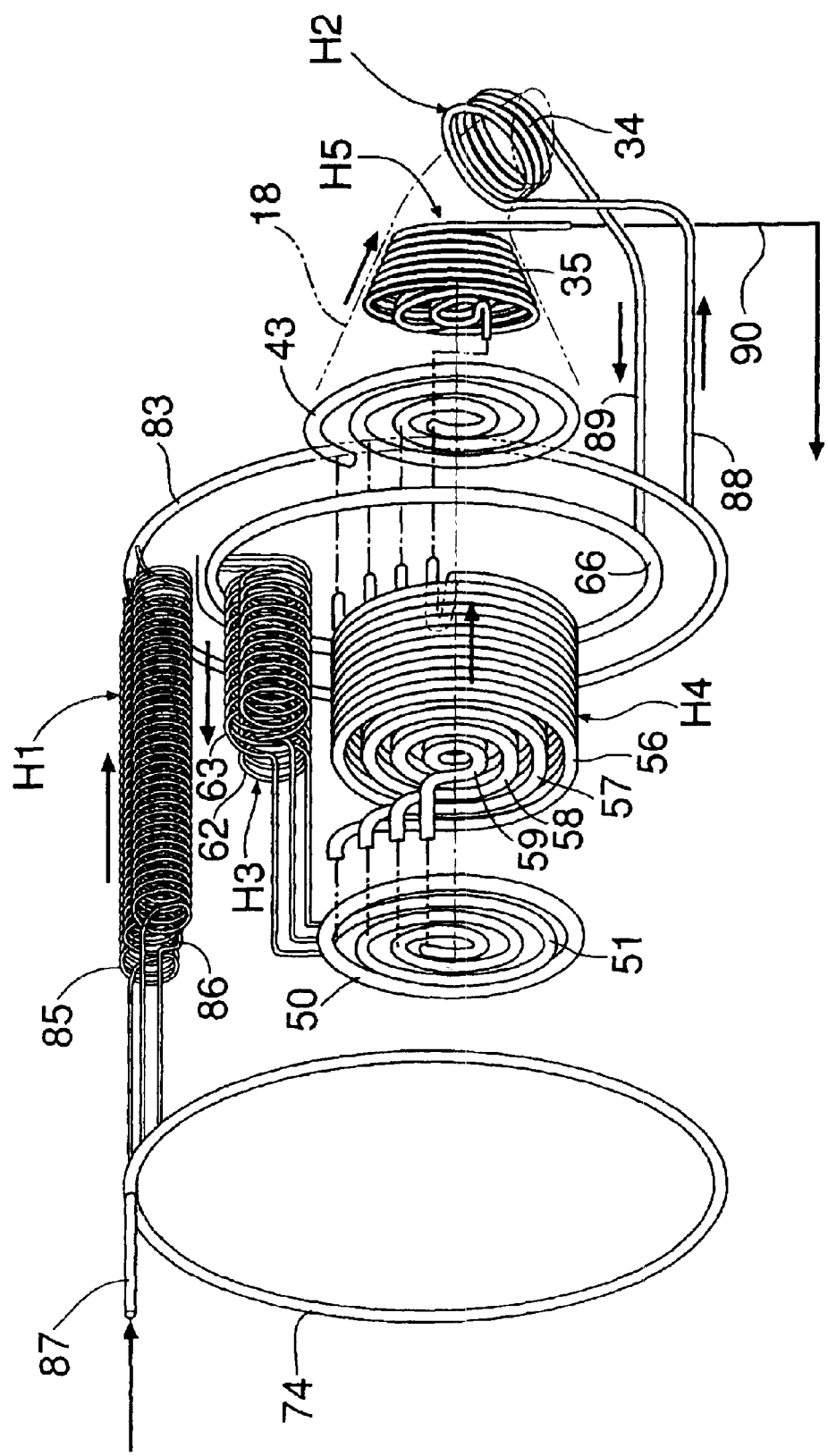

As is clear from reference to FIG. 11 a water inlet 87, into which water that is a source of high pressure steam is supplied, is provided in the first circular distribution passage 74, which communicates with the second circular distribution passage 83 via a large number of the heat transfer tubes 85, 86 of the first stage heat exchanger H1, and the second circular distribution passage 83 communicates with one end of the heat transfer tube 34 of the second stage heat exchanger H2 via a communicating passage 88. The other end of the heat transfer tube 34 of the second stage heat exchanger H2 communicates with the third circular distribution passage 66 via a communication passage 89, the third circular distribution passage 66 communicates with the fourth circular distribution passage 50 via the heat transfer tubes 62, 63 of the third stage heat exchanger H3, and the fourth circular distribution passage 50 communicates with the four heat transfer tubes 56 to 59 of the fourth stage heat exchanger H4 via the first helical distribution passage 51. The four heat transfer tubes 56 to 59 of the fourth stage heat exchanger H4 communicate with the steam outlet 90 via the second helical distribution passage 43 and the heat transfer tube 35 of the fifth stage heat exchanger H5.

In this way, while the water that is supplied from the water inlet 87 travels to the steam outlet 90 via the first stage heat exchanger H1→the second stage heat exchanger H2→the third stage heat exchanger H3→the fourth stage heat exchanger H4→the fifth stage heat exchanger H5, it exchanges heat with the exhaust gas that flows through the exhaust passage 33 of the internal combustion engine E, and becomes steam.

That is, while passing through the uniform diameter part 18a of the exhaust port 18 the exhaust gas coming out of the internal combustion engine E exchanges heat with the second stage heat exchanger H2 formed from the heat transfer tube 34 wound around the outer periphery of the uniform diameter part 18a. The exhaust gas that has flowed from the uniform diameter part 18a of the exhaust port 18 into the increasing diameter part 18b exchanges heat by direct contact with the fifth stage heat exchanger H5 formed from the heat transfer tube 35 wound into a triple coil shape and housed within the increasing diameter part 18b. Harmful components are removed from the exhaust gas coming out of the exhaust port 18 while it passes through the interiors of the first stage metal catalytic system 46A to the fourth stage metal catalytic system 46D and, at this point, the exhaust gas exchanges heat with the fourth stage heat exchanger H4 formed from the heat transfer tubes 56 to 59 arranged concentrically with the first stage to fourth stage metal catalytic systems 46A to 46D.

The exhaust gas that has passed through the first stage to fourth stage metal catalytic systems 46A to 46D and the fourth stage heat exchanger H4 is blocked by the end caps 67 and makes a U-turn, exchanges heat while flowing from the rear to the front through the third stage heat exchanger H3 formed from the heat transfer tubes 62, 63 disposed between the pair of cylindrical cases 60, 61, then changes direction through 180°, exchanges heat while flowing from the front to the rear through the first stage heat exchanger H1 formed from the heat transfer tubes 85, 86 disposed between the cylindrical case 76 and the inner wall member 84, and is finally discharged into the exhaust pipe 32 through the exhaust hole 72a of the distribution passage forming member 72.

The exhaust gas that has passed through the fifth stage heat exchanger H5 diffuses radially outward when passing through the helical opening 44 that communicates with the increasing diameter part 18b of the exhaust port 18, and is given a spiral flow by the guide vanes 45 attached to the interior of the helical opening 44. This makes the exhaust gas act uniformly over all of the first stage to fourth stage metal catalytic systems 46A to 46D and increases the residence time of the exhaust gas within the first stage to fourth stage metal catalytic systems 46A to 46D, thereby enhancing the exhaust gas purification effect. As shown in FIG. 7 in a magnified manner, since the phases of the corrugations of the metal supports 52 to 55 of each stage of the metal catalytic systems 46A to 46D are displaced by half a pitch from each other, a strong turbulent flow can be caused in the exhaust gas flow. This increases the residence time of the exhaust gas within the first stage to fourth stage metal catalytic systems 46A to 46D, thereby enhancing the exhaust gas purification effect and the heat exchange efficiency of the adjoining fourth stage heat exchanger H4.

Furthermore, the flow path lengths of the four heat transfer tubes 56 to 59, which include the flow path lengths of parts of the first and second helical distribution passages 51 and 43, can be made as uniform as possible by connecting the four heat transfer tubes 56 to 59 of the fourth stage heat exchanger H4 to optimal positions on the first helical distribution passage 51 and the second helical distribution passage 43; that is, connecting opposite ends of the heat transfer tube 56, which is radially outside and has a long pipe length, to the outside, in the radial direction, of the first helical distribution passage 51 and the inside, in the radial direction, of the second helical distribution passage 43; and connecting opposite ends of the heat transfer tube 59, which is radially inside and has a short pipe length, to the inside, in the radial direction, of the first helical distribution passage 51 and the outside, in the radial direction, of the second helical distribution passage 43, thereby reducing differences in pressure loss between the heat transfer tubes 56 to 59.

Moreover, since the first stage to fourth stage metal catalytic systems 46A to 46D and the fourth stage heat exchanger H4 are integrated so as to exchange heat with each other, the heat of reaction generated in the first stage to fourth stage metal catalytic systems 46A to 46D can be recovered by the fourth stage heat exchanger H4, thereby enhancing the thermal energy recovery effect and, furthermore, by controlling the flow rate of water flowing through the fourth stage heat exchanger H4 the first stage to fourth stage metal catalytic systems 46A to 46D can be heated and activated, or the first stage to fourth stage metal catalytic systems 46A to 46D can be cooled, thereby enhancing the durability.

The exhaust gas that has passed through the first stage to fourth stage metal catalytic systems 46A to 46D and the fourth stage heat exchanger H4 exchanges heat when passing through the first helical distribution passage 51, which is formed from a helical pipe material. Since this first helical distribution passage 51 diffuses the flow of the exhaust gas, hot spots can be prevented from occurring in the end cap 67 that is present to the rear of the passage 51 at the position where the exhaust gas turns back; the end cap 67, which is under thermally severe conditions, can be protected, and radiation of heat from the end cap 67 can be prevented. Moreover, since the first helical distribution passage 51, which is formed from the helical pipe material, is flexible, differences in thermal expansion between the four heat transfer tubes 56 to 59 having different overall lengths can be absorbed.

Basically, since the exhaust gas flows from the internal combustion engine E side to the exhaust pipe 32 side, whereas water flows from the exhaust pipe 32 side to the internal combustion engine E side, the exhaust gas and the water are in a cross-flow state, in which the heat exchange efficiency is high. Although, in order to realize a perfect cross-flow state, it is necessary to make the water flow in the order: first stage heat exchanger H1→third stage heat exchanger H3→fourth stage heat exchanger H4→fifth stage heat exchanger H5→second stage heat exchanger H2, in the present embodiment the water is made to flow in the order: first stage heat exchanger H1→second stage heat exchanger H2→third stage heat exchanger H3→fourth stage heat exchanger H4→fifth stage heat exchanger H5. That is, water firstly passes through the first stage heat exchanger H1, which is positioned on the most downstream side of the flow of exhaust gas, is then supplied to the second stage heat exchanger H2, which is positioned on the most upstream side of the flow of exhaust gas, and returns therefrom to the third stage heat exchanger H3, which is toward the downstream side of the flow of exhaust gas.

In this way, supplying low temperature water, which has not started heat exchange, to the fifth stage heat exchanger H5 positioned on the most downstream side of the flow of exhaust gas, that is, the fifth stage heat exchanger H5 through which flows the exhaust gas that has completed heat exchange and has a low temperature, can maintain a difference in temperature between the exhaust gas and the water and can recover recoverable thermal energy of the exhaust gas without waste, thereby increasing the efficiency of waste heat recovery from the exhaust gas. Furthermore, supplying comparatively low temperature water, which has passed only through the fifth stage heat exchanger H5, to the second stage heat exchanger H2 positioned immediately downstream from the exhaust valve 25 can allow the water to carry out heat exchange with the high temperature exhaust gas that has just been discharged from the combustion chamber 16, thus sufficiently cooling the exhaust port 18 and the exhaust valve 25 and increasing the durability thereof, which are exposed to high temperature, and decreasing the temperature of the exhaust port 18 and the temperature of the fifth stage heat exchanger H5 can reduce thermal leakage due to radiation of heat and reduce the influence of heat on devices such as a valve operating mechanism, for which precision maintenance is required.

Figure 12A:
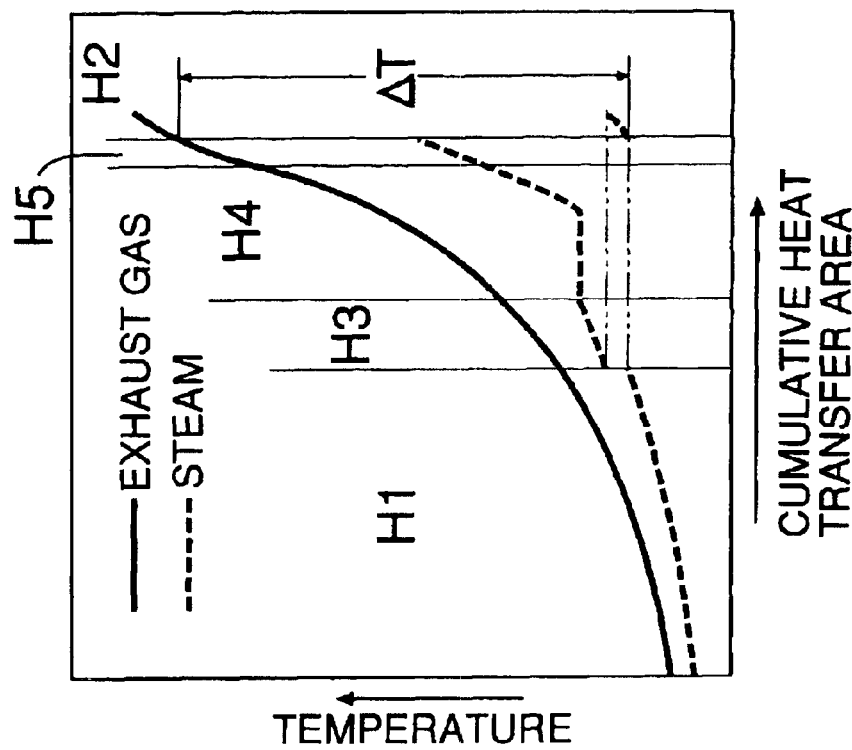
FIG. 12A is a graph showing changes in the exhaust gas temperature and the vapor temperature with the cumulative heat transfer area of a conventional heat exchanger.
Figure 12B:
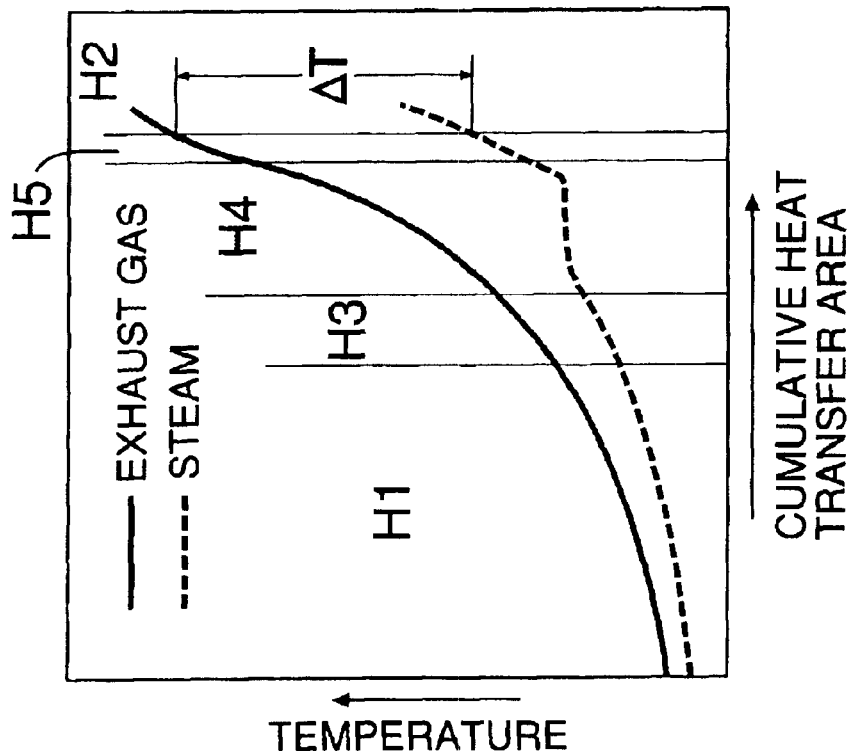

In the graphs of FIG. 12A and FIG. 12B, the abscissa denotes the cumulative heat transfer area of the heat exchangers H1 to H5, measured from the position of the water inlet 87, and the ordinate denotes the temperature of the exhaust gas and the temperature of the water (steam); FIG. 12A shows a conventional case in which water flows in the order: first stage heat exchanger H1→third stage heat exchanger H3→fourth stage heat exchanger H4→fifth stage heat exchanger H5→second stage heat exchanger H2; and FIG. 12B shows the present embodiment in which water flows in the order: first stage heat exchanger H1→second stage heat exchanger H2→third stage heat exchanger H3→fourth stage heat exchanger H4→fifth stage heat exchanger H5.

As is clear from FIG. 12A showing the conventional case, as the cumulative heat transfer area increases, that is, as the combustion chamber 16 of the internal combustion engine E is approached, the temperature of the exhaust gas and the temperature of the water increase, the difference in temperature $\Delta T$ between the exhaust gas and the water in the second stage heat exchanger H2, which is the final stage, is comparatively small, and the ability to cool the exhaust port 18 and the exhaust valve 25, which are exposed to high temperature, deteriorates. On the other hand, as is clear from FIG. 12B showing the present embodiment, since the temperature of water passing through the second stage heat exchanger H2 immediately downstream from the exhaust valve 25 is comparatively low, the difference in temperature $\Delta T$ between the water and the exhaust gas passing there is comparatively large, and the exhaust port 18 and the exhaust valve 25, which are exposed to high temperature, can be cooled effectively.

Moreover, since the exhaust passage 33 is bent into a three stage zigzag shape and the first stage, third stage, and fourth stage heat exchangers H1, H3, H4 are disposed in layers in the radial direction, the overall dimensions of the integrated evaporator type exhaust gas purification system C can be reduced as much as possible while minimizing thermal leakage and preventing noise from being dissipated from the interior thereof, thereby providing a compact layout thereof in the cylinder head 12 of the internal combustion engine E. Moreover, since the first stage, third stage, and fourth stage heat exchangers H1, H3, H4 and the first stage to fourth stage metal catalytic systems 46A to 46D are arranged in a labyrinth-like form by disposing them in layers in the radial direction, not only can their silencing effect be effective in preventing exhaust noise from leaking outside the integrated evaporator type exhaust gas purification system C, but also an exhaust gas temperature lowering effect can be given, mainly by the first stage to fifth stage heat exchangers H1 to H5. This allows an exhaust muffler to be simplified or omitted, thereby making the exhaust system itself compact and lightweight. Furthermore, since the decrease in exhaust gas temperature causes the temperature of the exhaust passage to decrease, in particular on the downstream side of the first stage heat exchanger H1, the degrees of freedom in design with regard to heat resistance increase, and the use of a material such as a plastic for the exhaust passage becomes possible. As a result, with regard to the internal combustion engine E for a vehicle, the degrees of freedom in the shape of the exhaust passage, the degrees of freedom in mounting on the vehicle, the degrees of freedom in terms of cooling characteristics, etc. increase, thereby increasing the degrees of freedom in the design of the entire vehicle, which has been subjected to restrictions by conventional exhaust systems, and contributing to a reduction in the overall weight of the exhaust system.

Although an embodiment of the present invention is explained in detail above, the present invention can be modified in a variety of ways without departing from the spirit and scope thereof.

For example, the evaporator of the embodiment includes a total of five stages of heat exchangers H1 to H5, but the present invention can be applied to one having a total of at least three stages of heat exchangers. Furthermore, in the embodiment the integrated evaporator type exhaust gas purification system C is illustrated, but the present invention can be applied to a heat exchanger that is separate from an exhaust gas purification system. Moreover, in the embodiment water is illustrated as the working medium, but a working medium other than water can also be employed.

Industrial Applicability

As hereinbefore described, the internal combustion engine waste heat recovery system related to the present invention can be suitably applied to an evaporator of a Rankine cycle system of an internal combustion engine, but it can also be applied to a waste heat recovery system for any other purpose as long as waste heat of an exhaust gas of an internal combustion engine is utilized.

What is claimed is:

1. An internal combustion engine waste heat recovery system comprising:
    at least three stages of heat exchangers in an exhaust passage, a working medium flowing through the heat exchangers and carrying out heat exchange with an exhaust gas, and the heat exchanger disposed on the most upstream side of the flow of exhaust gas being positioned immediately downstream from an exhaust valve,
    wherein the working medium is firstly supplied to the heat exchanger disposed on the most downstream side of the flow of exhaust gas, and then supplied to the heat exchanger disposed on the most upstream side of the flow of exhaust gas.

2. The internal combustion engine waste heat recovery system according to claim 1, wherein the working medium is next supplied to a third heat exchanger disposed directly upstream in the flow of exhaust gas relative to the heat exchanger disposed on the most downstream side of the flow of exhaust gas.

3. The internal combustion engine waste heat recovery system according to claim 2, wherein the working medium is next supplied to a fourth centrally disposed heat exchanger disposed directly upstream in the flow of exhaust gas relative to the third heat exchanger.

4. The internal combustion engine waste heat recovery system according to claim 3, wherein the working medium is next supplied to a fifth centrally disposed heat exchanger disposed directly upstream in the flow of exhaust gas relative to the heat exchanger on the most upstream side of the flow of exhaust gas.

5. The internal combustion engine waste heat recovery system according to claim 4, and further including a fifth distribution passage for communicating with the communication passage connected to the fourth heat exchanger and for supplying the working medium to the fifth heat exchange.

6. The internal combustion engine waste heat recovery system according to claim 3, and further including a fourth distribution passage for communicating with the communication passage connected to the third heat exchanger and for supplying the working medium to the fourth heat exchange.

7. The internal combustion engine waste heat recovery system according to claim 2, and further including a third distribution passage for communicating with the communication passage connected to the heat exchanger disposed on the most upstream side of the flow of exhaust gas and for supplying the working medium to the third heat exchange.

8. The internal combustion engine waste heat recovery system according to claim 1, and further including a first distribution passage for communicating with the heat exchanger disposed on the most downstream side of the flow of exhaust gas.

9. The internal combustion engine waste heat recovery system according to claim 1, and further including a second distribution passage for communicating with the heat exchanger disposed on the most downstream side of the flow of exhaust gas and for supplying the working medium to a communication passage connected to the heat exchanger disposed on the most upstream side of the flow of exhaust gas.

10. The internal combustion engine waste heat recovery system according to claim 1, wherein the heat exchanger disposed on the most upstream side of the flow of exhaust gas is externally mounted on an exhaust port housing for the exhaust valve.

* * * * *